BUOYANT DEVICE

Original Filed July 6, 1966 2 Sheets-Sheet 1

INVENTOR.
CHARLES GARLAND

Donald R. Johnson
ATTORNEY

BUOYANT DEVICE

Original Filed July 6, 1966 2 Sheets-Sheet 2

INVENTOR:
CHARLES GARLAND
BY Donald R. Johnson
ATTY.

United States Patent Office

Re. 27,372
Reissued May 16, 1972

27,372
BUOYANT DEVICE

Charles Garland, Newport News, Va., assignor to Sun Shipbuilding & Dry Dock Company, Chester, Pa.

Original No. 3,407,417, dated Oct. 29, 1968, Ser. No. 563,193, July 6, 1966. Application for reissue Dec. 18, 1969, Ser. No. 888,177
Int. Cl. B63b *21/52*
U.S. Cl. 9—8 R 3 Claims

Matter enclosed in heavy brackets [ ] appears in the original patent but forms no part of this reissue specification; matter printed in italics indicates the additions made by reissue.

ABSTRACT OF THE DISCLOSURE

A buoyant hollow sphere, designed for deep submergence, is internally pressurized with inert gas to enable reduction in its wall thickness and, hence, its weight. A diametrically-extending sleeve is welded through the wall of the sphere, to enable the sphere to be slid over a pipe which is to be buoyed up.

This invention relates to a buoyant device, and more particularly to a device which has a buoyant effect and which is submergible to a considerable depth in water.

For various purposes connected with oceanography or undersea exploration, buoyant devices which can be submerged to a considerable depth (in the range of 500 to 3000 feet, for example) are desired. Such buoyant devices preferably take the form of rigid hollow spheres formed from a suitable metal. When one of these spheres is submerged, the net buoyant force provided thereon (i.e., the buoyancy of the sphere) is the difference between the weight of the water displaced and the weight of the sphere itself. Thus, the less the weight of the sphere, the greater will be the buoyancy. In order to increase the buoyance of the sphere (which is desirable), it might be thought that the wall thickness of the sphere could be decreased, to thereby reduce its weight. However, with the conventional type of device, the minimum wall thickness is determined by buckling criteria and cannot be reduced.

An object of this invention is to provide a method whereby the wall thickness of a submergible hollow sphere may be reduced, thereby to decrease its weight and increase its buoyancy.

Another object is to provide a novel type of buoyant device in the form of a hollow sphere.

The objects of this invention are accomplished, briefly, in the following manner: the interior of a submergible rigid hollow sphere is pressurized to an appropriate superatmospheric pressure, with a suitable fluid (e.g., an inert gas), prior to submergence of the sphere. This pressurization decreases the net effective inwardly-directed pressure acting on the wall of the sphere when the same is submerged, enabling the wall thickness to be reduced and the buoyancy of the sphere to thereby be increased.

A detailed description of the invention follows, taken in conjunction with the accompanying drawings, wherein.

Hollow steel spheres can resist internal pressure loading better than an external pressure loading. External hydrostatic pressure loadings produce compressive stresses in the wall [membrance] *membrane* and this imposes a stability problem. The stability criteria, with external pressure loading, is closely related to the accuracy to which the sphere is fabricated. Small, difficult to measure, flat areas can cause structural failure due to instability of the wall. The process of imposing an internal pre-load (tensile stress) to the wall of buoyancy spheres before submergence, reduces the compressive service stress; this in turn, lessens the stability problem. In the design process, it is possible to pre-load the sphere to a tensile stress load corresponding with the compressive stress, depth load. This design would result in zero service stress when submerged at the design depth. Submergence spheres using this design concept would have extremely long and reliable service lives.

A further advantage in using this design concept relates to stress corrosive properties of many metals. Many steels exhibit the characteristic of corrosion cracking when stressed in a corrosive media. The design feature of zero service stress will decrease the concern of this behavior.

A variety of pre-loading combinations for various designs can be considered for buoyancy spheres which are stress limited by design; the internal pressure pre-load could reduce the compressive service stress by a factor of two. This pre-load would be determined by dividing the service depth by two. Numerous other combinations of this type can be employed to advantage in this design process.

Figure 1:
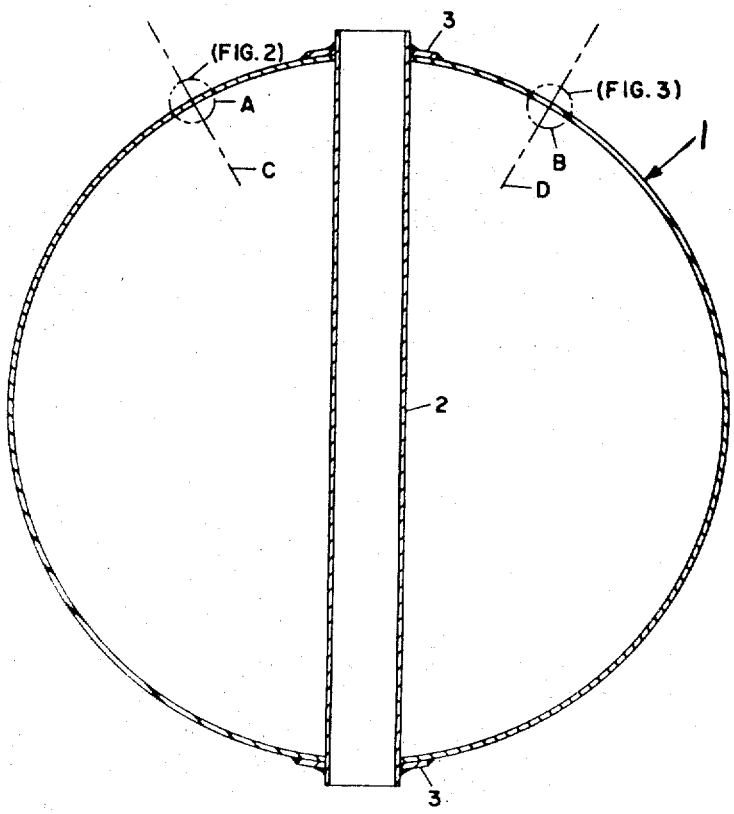
FIG. 1 is a diametral section through a typical buoyant device (sphere) according to this invention, designed to provide a buoyant force on a vertically-extending submerged pipe, with certain details shown in other figures omitted.

Referring now to FIG. 1, a rigid hollow sphere 1, which is fabricated from a suitable metal such as titanium or the steel alloy known as maraging steel, has a sealed hollow interior which provides a pressure-tight chamber. By way of example, the sphere 1 is formed from two prefabricated hemispherical sections which are then welded together in a circumferential or girth weld; this weld may lie in the plane of the horizontal diameter in FIG. 1. In a typical assembly, the sphere 1 may have an O.D. of 5½ feet. For a typical use of the spheres of this invention (which use will be described hereinafter), an imperforate sleeve 2 (which may be a pipe [14] *fourteen* inches in diameter, for example) extends diametrically through the interior of sphere 1, and is sealed through the wall of the sphere (as by welding, for example (at its two respective opposite ends. Strengthening or reinforcing plates 3, of circular outer configuration, are welded to the outside of sleeve 2 and to the outer surface of the sphere 1, one plate at each end of the sleeve 2. It will be appreciated that the ends of sleeve 2 pass through respective holes cut through the wall of sphere 1, and that the plates 3 aid in sealing the sleeve 2 through the wall of the sphere. *It may be noted here that the buoyant sphere is normally used in the position illustrated in FIG. 1, and in this position the sleeve 2 is sealed through the wall of the sphere at locations on the upper and lower surfaces, respectively, of the sphere.*

For certain uses of the spheres other than that presently being described, the sleeve 2 and the reinforcing plates 3 would be omitted.

The weight of the water displaced by sphere 1, when the same is submerged, is in excess of the weight of the sphere shown in FIG. 1 (which latter weight would, of course, have to include that of the sleeve 2), so that the sphere is buoyant. That is to say, a net [bouyant] *buoyant* force is provided on the sphere when it is submerged. A continuous walled sphere 5½ feet in diameter has a volume of about 87.11 cubic feet, and assuming a density of 64 pounds per cubic foot for sea water, the weight of the water displaced by such a sphere would be about 5575 pounds. The weight of the sphere and sleeve assembly illustrated in FIG. 1 is considerably less than its water displacement (even though the latter would be somewhat less than 5575 pounds, because of the presence of sleeve 2, which is open to the water), so the sphere assembly has a substantial net buoyancy, well in excess of 2000 pounds.

According to this invention, the sphere 1 is internally pressurized to a superatmospheric pressure (on the order of 1000 p.s.i.g., for example) with a suitable fluid (e.g., an inert gas), prior to submergence of the sphere. This internal pressurization reduces the differential pressure across the wall of the sphere when the same is submerged; that is to say, this internal pressure opposes the external water pressure on the sphere wall, and thus decreases the net effective inwardly-directed pressure acting on the wall of the sphere when the latter is submerged. This enables a reduction in the wall thickness of the sphere, thus reducing its total weight. Since the net buoyancy of the sphere is equal to the weight of the water displaced less the weight of the sphere, reduction of the latter means an increase in the buoyancy of the sphere. This end result is, of course, highly desirable.

Also, as a corollary result, for any particular designed wall thickness the maximum permissible working (submerged) depth of the sphere is increased by internal pressurization, since a portion of the water pressure on the outside of the wall is counterbalanced by the gas pressure on the inside of the wall.

Figure 2:
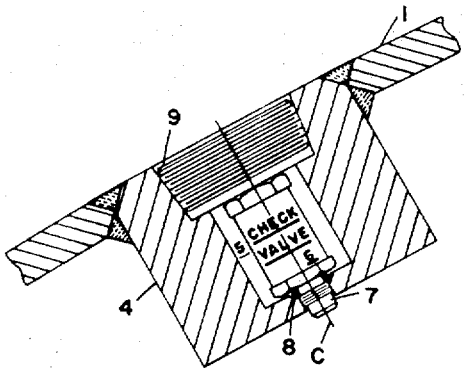
FIG. 2 is a detailed view, drawn on an enlarged scale, of that portion of FIG. 1 indicated by dot-dash circle A.

For internally pressurizing the sphere 1, a fitting including a check valve is provided in the wall of the hollow sphere, at a location A in the upper hemisphere and centered on a line C which may make an angle of 30° with the center line of sleeve 2 (not shown in FIG. 1, but assumed to lie along the vertical diameter of the sphere). For convenience in illustration, the fitting just mentioned is not illustrated in FIG. 1, but is illustrated on an enlarged scale in the detail drawing of FIG. 2, to which latter reference will now be made.

A cylindrical housing member 4 is welded in a suitable opening (centered on line C) providing in the wall of sphere 1, the outer end of housing 4 being made flush with the outer surface of sphere 1. The housing 4 has therein a central bore 5 which terminates short of the inner end of the housing, and in this bore is positioned a check valve 6 (rated at 3000 p.s.i., for example) which permits the free flow of gas in a radially-inward direction (i.e., toward the center of the sphere), but prevents flow in the opposite direction. For mounting the check valve 6 in position, the outlet tube 7 of the check valve carries external threads which engage the threads of a central tapped aperture provided at the inner end of housing 4. An O-ring 8, positioned in a suitable groove in housing 4, provides a seal outwardly of the threads just mentioned. It may be noted that the body of housing 4 extends inwardly, into the interior of the sphere, and that the check valve [oulet] *outlet* tube 7 communicates, through the aperture at the inner end of housing 4, with the interior of the sphere.

For closing the outer end of bore 5, such outer end is enlarged in diameter and tapped, and a standard pipe plug 9 is screwed into the threads so provided. Plug 9 covers the inlet of check valve 6.

Figure 4:
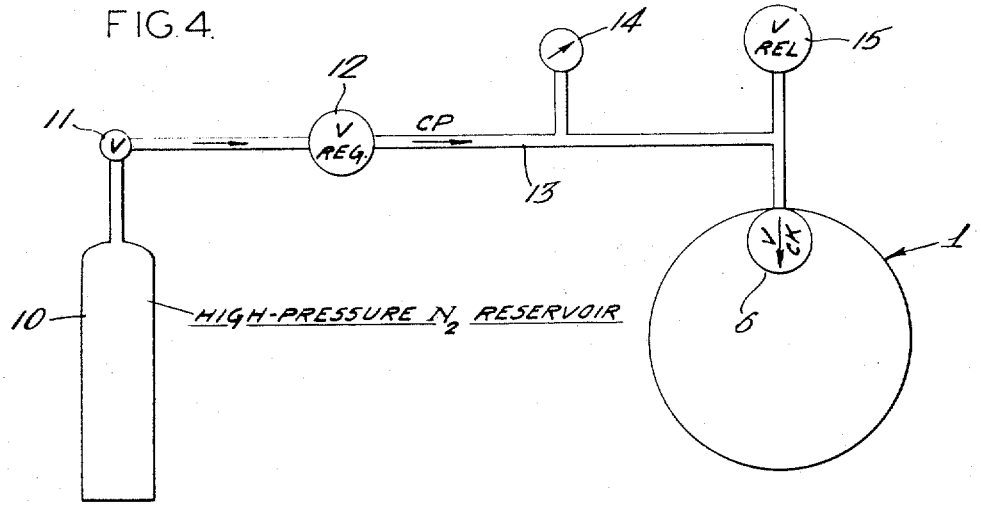
FIG. 4 is a diagrammatic view of a typical apparatus setup for internal pressurization of the sphere of FIG. 1 [.] *; and*

For pressurizing the interior of the sphere 1 prior to its submergence, the apparatus setup illustrated diagrammatically in FIG. 4 may be used. A high-pressure (e.g., 3000 p.s.i.g.) reservoir 10 of an inert gas such as nitrogen is connected through a manually-operated valve 11 to the inlet side of a constant pressure outlet valve (regulator valve) 12, which latter provides a pressure of 1000 p.s.i.g. at its outlet. The outlet of valve 12 is connected by means of a length of tubing 13 to the inlet of check valve 6 of the sphere 1, plug 9 having been of course previously removed. A pressure gauge 14 indicates the pressure in tubing 13 (and also in sphere 1). A pressure relief valve 15 (burst disc safety valve), set to operate at say 1500 p.s.i.g., is connected to tubing 13.

When the sphere 1 has been connected to the pressurizing apparatus as shown in FIG. 4, nitrogen is caused to flow from reservoir 10 into sphere 1 by way of check valve 6, thus pressurizing the interior of the sphere to the desired superatmospheric pressure (e.g., about 1000 p.s.i.g.) as shown on gauge 14. Then, sphere 1 is disconnected from the tubing 13, following which plug 9 is replaced and the sphere is ready for submergence.

Figure 3:
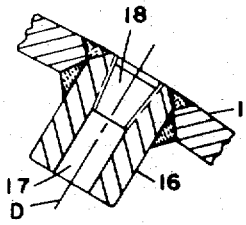
FIG. 3 is a detailed view, drawn on an enlarged scale, of that portion of FIG. 1 indicated by the dot-dash circle B; [and]

A drain or depressuring fitting is provided in the wall of the hollow sphere 1, at a location B in the upper hemisphere and centered on a line D which may make an angle of 30° with the center line of sleeve 2, but on the opposite side from the center line C previously described. The fitting just mentioned is not illustrated in FIG. 1, but is illustrated on an enlarged scale in the detail drawing of FIG. 3, to which latter reference will now be made.

A half tapped pipe coupling 16 is welded in a suitable opening (centered on line D) provided in the wall of sphere 1, the outer end of coupling 16 being made flush with the outer surface of sphere 1. The central bore 17 of coupling 16 communicates with the interior of the sphere, and the outer internally threaded end of coupling 16 is closed by means of a standard pipe plug 18 which engages these threads. The plug 18 is unscrewed whenever it is desired to depressure the interior of the sphere.

Figure 5:
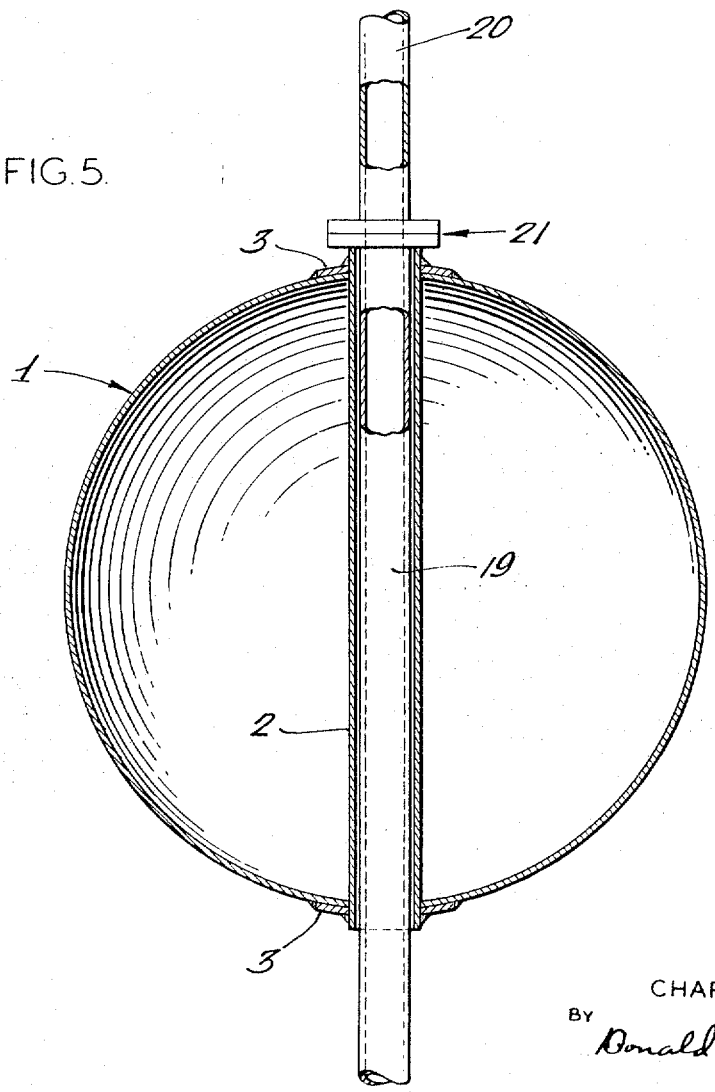
*FIG. 5 is a view similar to FIG. 1, but showing the arrangement whereby the sphere provides a buoyant force on a vertically-extending submerged pipe.*

In a typical use of the buoyant spheres of this invention, the sphere and sleeve assembly of FIG. 1 may be used to provide a buoyant force on an individual joint of a string of vertically-extending submerged pipe, termed riser pipe. *This is illustrated in FIG. 5, which shows portions of two individual joints 19 and 20 in a string of riser pipe, these two joints being coupled together by a coupling 21 of conventional type.* The central sleeve 2 of the [FIG. 1] *sphere-sleeve* assembly will slip over the O.D. of [the] *a* riser pipe *joint such as 19* and then, when the sphere is submerged, the upper end of the sleeve or mandrel 2 will bear against the riser pipe joint coupling *21, as illustrated in FIG. 5,* and thereby transfer the lifting force of the buoyant sphere *1* to the riser pipe *joint 19.*

As previously stated, for other uses of the buoyant spheres the sleeve or mandrel 2 would be omitted, leaving a continuous-walled sphere. For such other uses, the sphere could be of considerably smaller diameter than that mentioned previously; it might be 23½ inches in diameter, by way of example.

The invention claimed is:

1. A buoyant device comprising a submergible rigid hollow sphere of a size such that the weight of the water displaced by said sphere when submerged is in excess of the weight of the sphere, thereby providing a net buoyant force on said sphere, the hollow interior of said sphere being sealed off from the surrounding water and containing an inert gas under superatmospheric pressure, said sphere having a drain aperture through the wall thereof; a plug normally closing said aperture, an open-ended sleeve extending diametrically through the interior of said sphere and sealed at its respective opposite ends through the wall of said sphere, the length of said sleeve being substantially equal to the diameter of said sphere; and a check valve sealed through the wall of said sphere and arranged to permit flow therethrough in the inward direction only, toward the interior of the sphere, thereby to permit initial pressurization of said sphere.

*2. In combination, a buoyant device comprising a submergible rigid hollow sphere of a size such that the weight of the water displaced by said sphere when submerged is in excess of the weight of the sphere, thereby providing a net buoyant force on said sphere, the hollow interior of said sphere being sealed off from the surrounding water*

*and containing a gas under superatmospheric pressure; an open-ended sleeve extending through the interior of said sphere and sealed through the wall of the sphere at locations on the upper and lower surfaces of said sphere, a check valve sealed through the wall of said sphere and arranged to at all times permit flow therethrough in the inward direction, toward the interior of the sphere, and to at all times prevent flow therethrough in the outward direction, thereby to permit pressurization of the interior of said sphere with said gas; a pipe extending through said sleeve, and means for transferring the lifting force of said buoyant sphere to said pipe.*

*3. In combination, a buoyant device comprising a submergible rigid hollow sphere of a size such that the weight of the water displaced by said sphere when submerged is in excess of the weight of the sphere, thereby providing a net buoyant force on said sphere, the hollow interior of said sphere being sealed off from the surrounding water and containing a gas under superatmospheric pressure, said sphere having a drain aperture through the wall thereof; a plug normally closing said aperture, an open-ended sleeve extending through the interior of said sphere and sealed through the wall of the sphere at locations on the upper and lower surfaces of said sphere, a check valve sealed through the wall of said sphere and arranged to at all times permit flow therethrough in the inward direction, toward the interior of the sphere, and to at all times prevent flow therethrough in the outward direction, thereby to permit pressurization of the interior of said sphere with said gas; a pipe extending through said sleeve, and means for transferring the lifting force of said buoyant sphere to said pipe.*

References Cited

The following references, cited by the Examiner, are of record in the patented file of this patent or the original patent.

UNITED STATES PATENTS

| | | | |
|---|---|---|---|
| 875,875 | 1/1908 | Willson | 9—8 R |
| 1,332,384 | 3/1920 | Dray | 114—54 |
| 2,060,670 | 11/1936 | Hartman | 9—8 R X |
| 3,112,724 | 12/1963 | Rosen | 114—16 |
| 3,236,267 | 2/1966 | Bily | 9—8 P X |

MILTON BUCHLER, Primary Examiner

G. W. O'CONNOR, Assistant Examiner